(12) United States Patent
Geiger

(10) Patent No.: US 6,533,226 B2
(45) Date of Patent: Mar. 18, 2003

(54) SADDLE MOUNT

(75) Inventor: Gerard G. Geiger, Jackson, WI (US)

(73) Assignee: HellermannTyton Corporation, Milwaukee, WI (US)

( * ) Notice: Subject to any disclaimer, the term of this patent is extended or adjusted under 35 U.S.C. 154(b) by 0 days.

(21) Appl. No.: 09/999,901

(22) Filed: Sep. 14, 2001

(65) Prior Publication Data

US 2002/0084388 A1 Jul. 4, 2002

Related U.S. Application Data

(60) Provisional application No. 60/232,360, filed on Sep. 14, 2000.

(51) Int. Cl.[7] ................................................. F16L 3/12
(52) U.S. Cl. ..................................... 248/74.3; 248/68.1
(58) Field of Search ........................ 248/68.1, 49, 74.1, 248/74.2, 74.3

(56) References Cited

U.S. PATENT DOCUMENTS

| | | | | |
|---|---|---|---|---|
| 3,250,505 A | * | 5/1966 | Rodman, Sr. et al. | ......... 248/49 |
| 3,486,725 A | * | 12/1969 | Hidassy | ......... 248/68 |
| 3,632,070 A | * | 1/1972 | Thayer | ......... 248/68 |
| 3,913,876 A | * | 10/1975 | McSherry | ......... 248/74 PB |
| 4,768,741 A | * | 9/1988 | Logsdon | ......... 248/62 |
| 4,925,136 A | * | 5/1990 | Knott | ......... 248/62 |
| 5,332,179 A | * | 7/1994 | Kuffel et al. | ......... 248/743 |
| 5,337,983 A | * | 8/1994 | Mailey | ......... 248/74.3 |
| 5,386,615 A | * | 2/1995 | Bernard | ......... 24/16 PB |
| 5,653,409 A | * | 8/1997 | White, Jr. et al. | ......... 248/73 |
| 5,730,399 A | * | 3/1998 | Baginski | ......... 248/58 |
| 5,820,048 A | * | 10/1998 | Shereyk et al. | ......... 248/68.1 |
| 6,196,751 B1 | * | 3/2001 | Khokhar | ......... 403/3 |

\* cited by examiner

*Primary Examiner*—Ramon O. Ramirez
*Assistant Examiner*—Kofi Schulterbrandt
(74) *Attorney, Agent, or Firm*—Ryan Kromholz & Manion, S.C.

(57) ABSTRACT

A mounting assembly for securing one or more elongated items to a structural member. In one embodiment, the assembly may include a saddle mount device, a button head cable tie and may include one or more conventional cable ties. The saddle mount has at least one primary funnel-shaped aperture and may include additional apertures. The button head cable tie secures or cradles the elongate items to the saddle mount and secures the saddle mount to the structural member. The saddle mount base mates with the structural member. The resulting assembly holds the items in a spaced-apart relationship from the structural member. The conventional cable ties may be used to secure additional items to the saddle mount. Alternate embodiments include an integral or separate mounting member to affix the mounting assembly to the structural member.

10 Claims, 19 Drawing Sheets

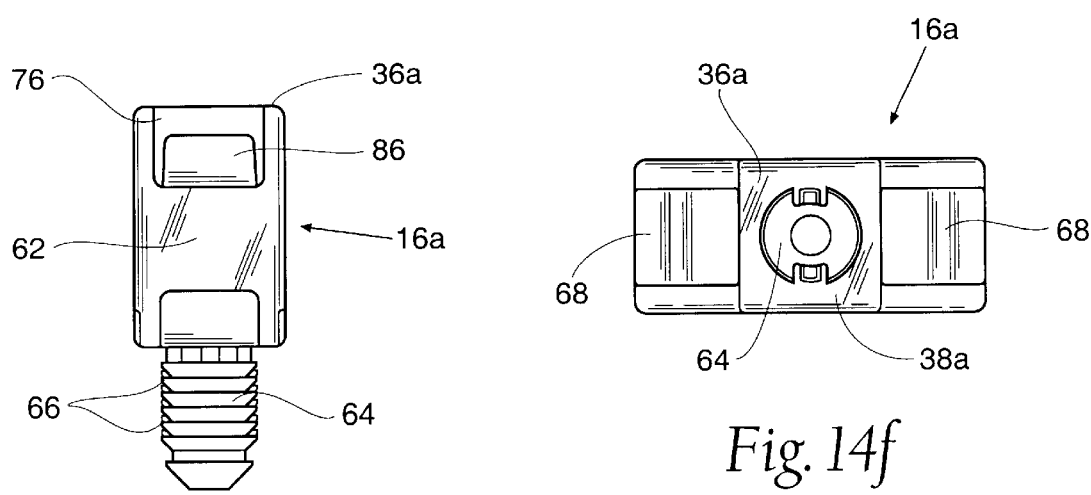
Fig. 14e
Fig. 14f
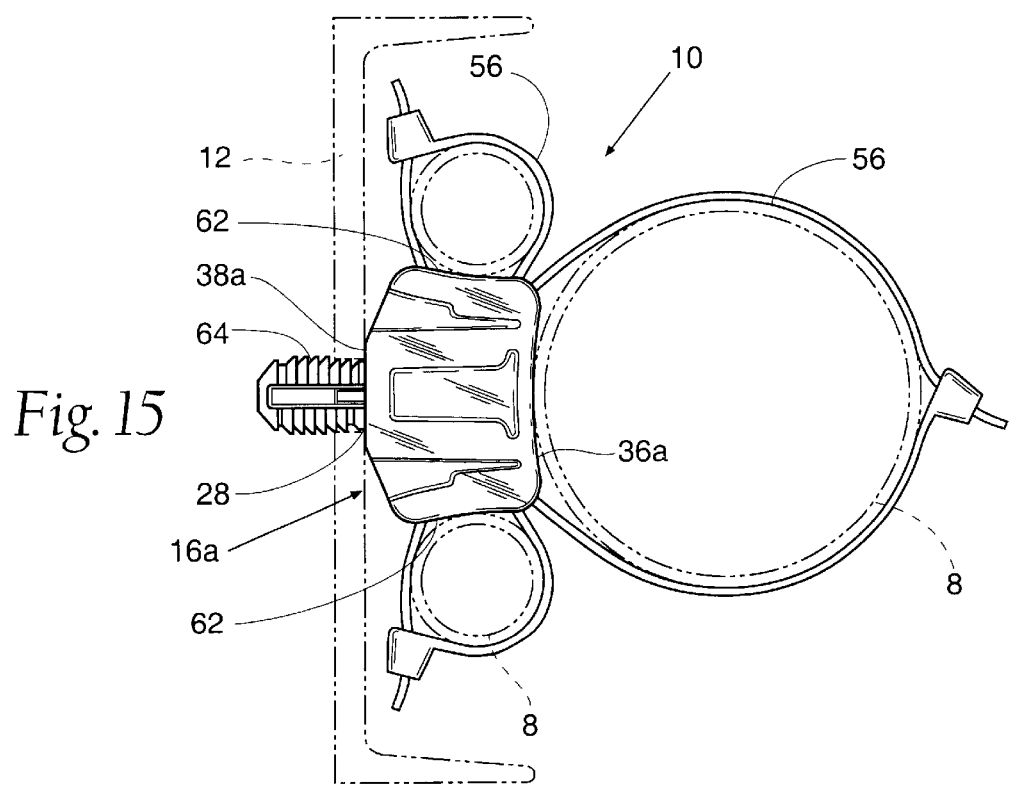
Fig. 15

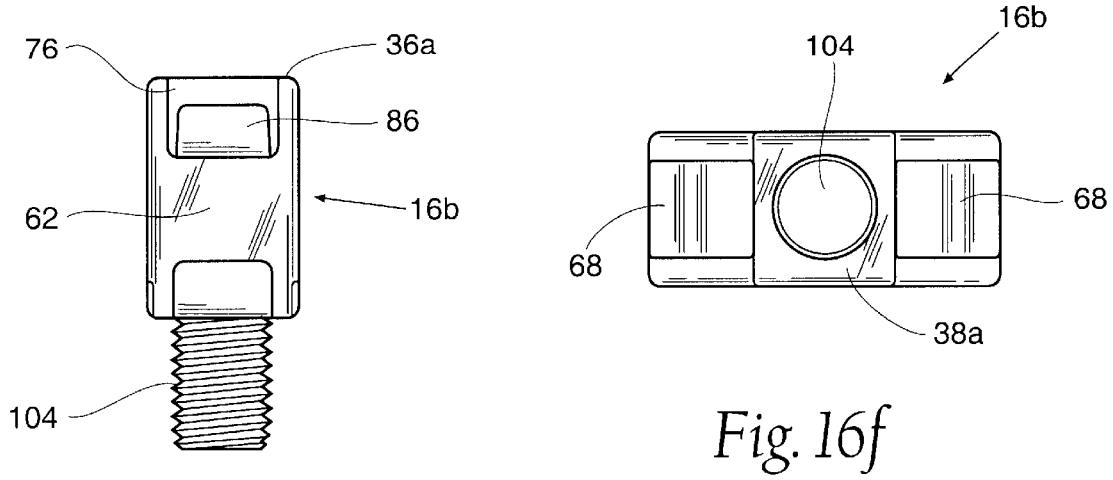
Fig. 16e
Fig. 16f
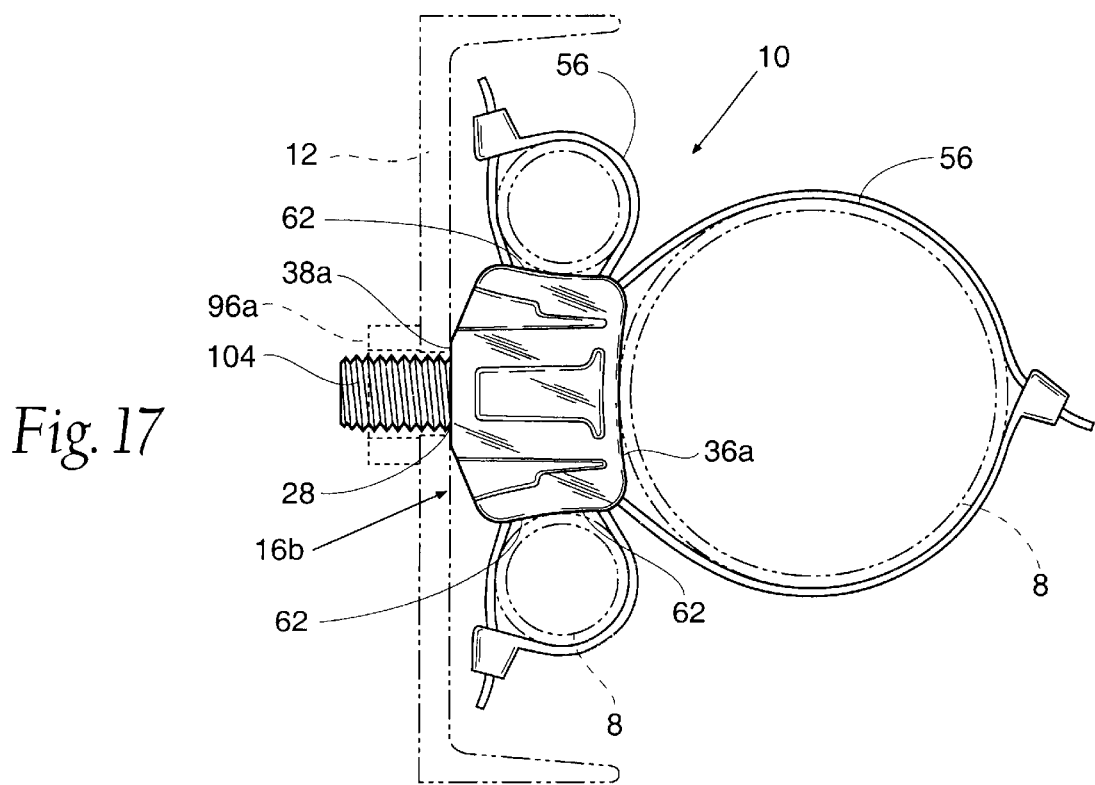
Fig. 17

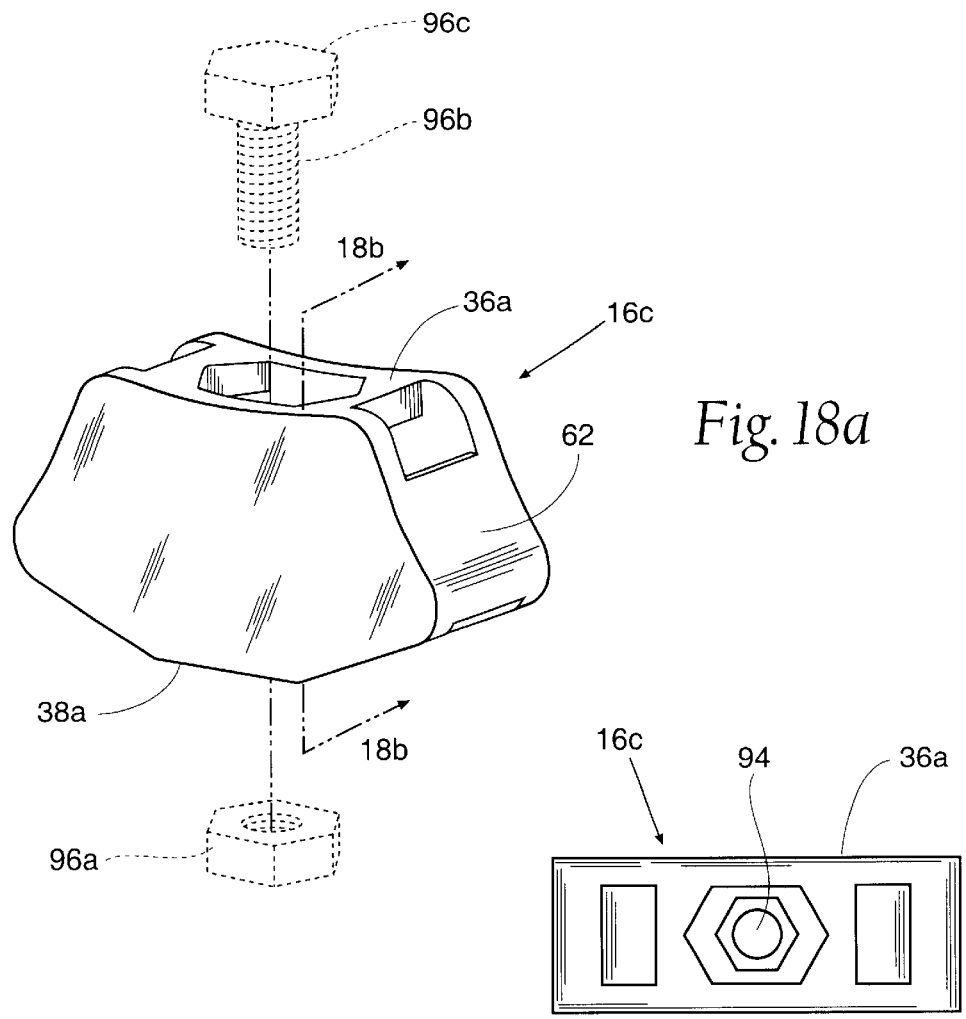
Fig. 18a
Fig. 18c
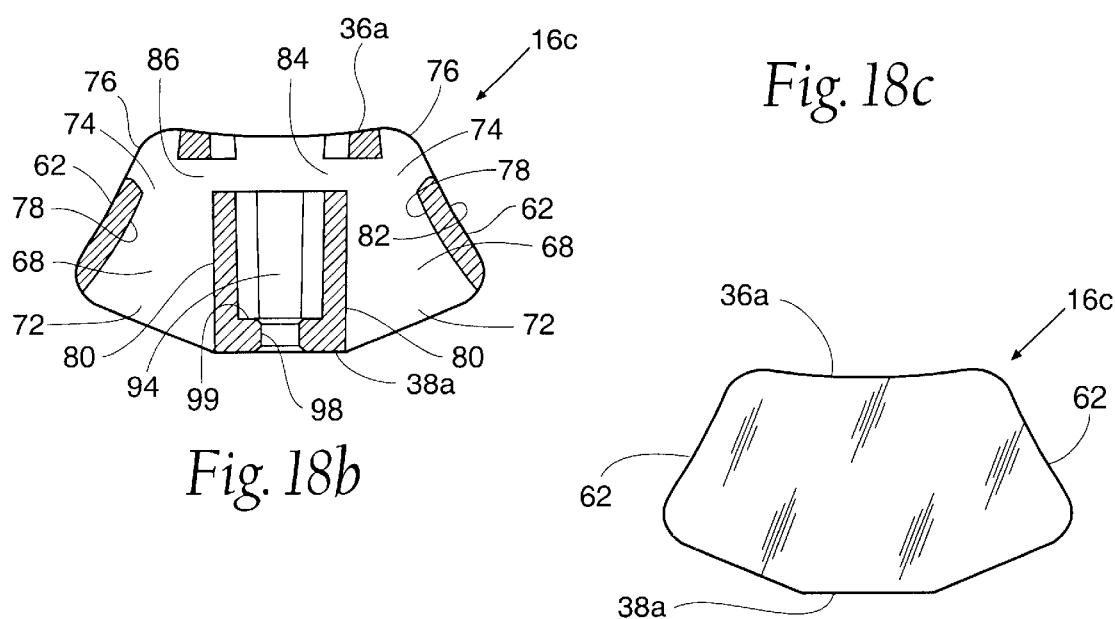
Fig. 18b
Fig. 18d

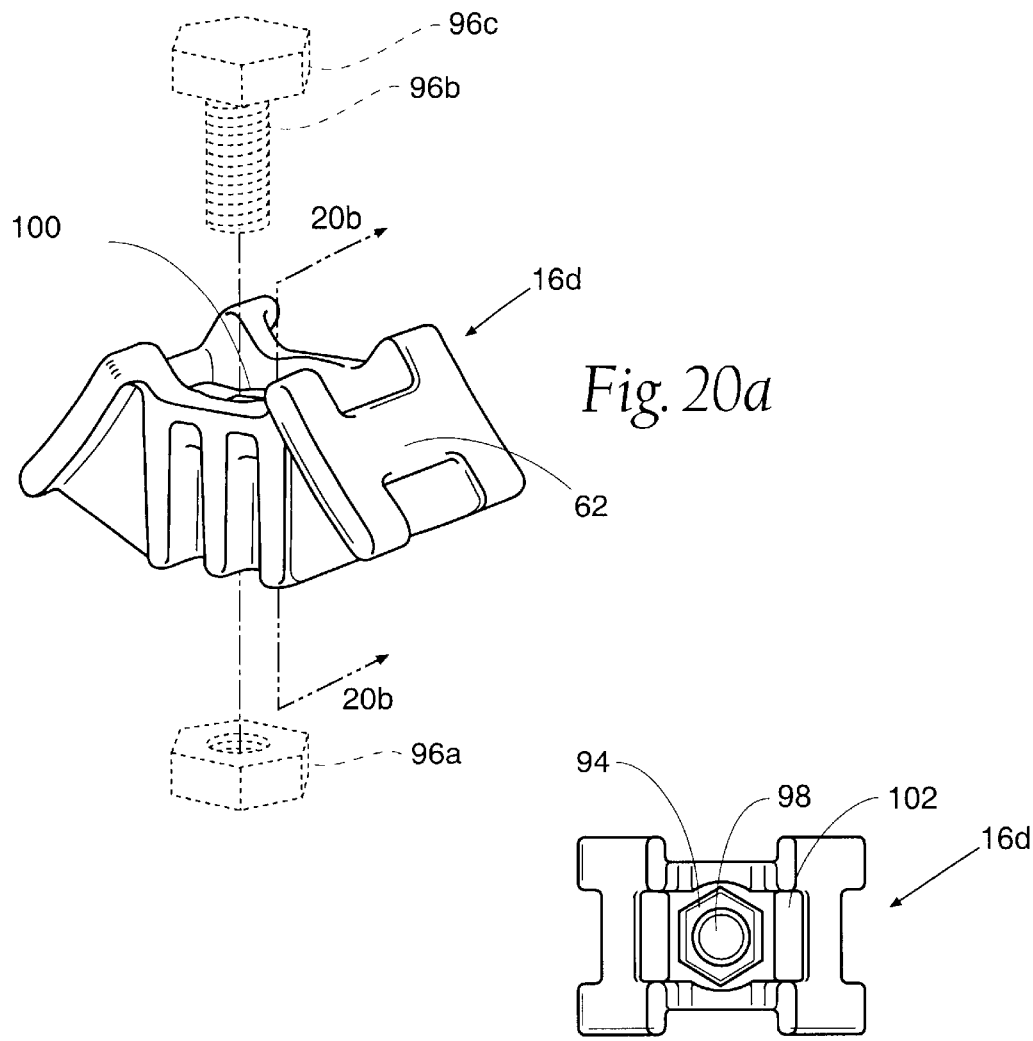
Fig. 20a
Fig. 20c
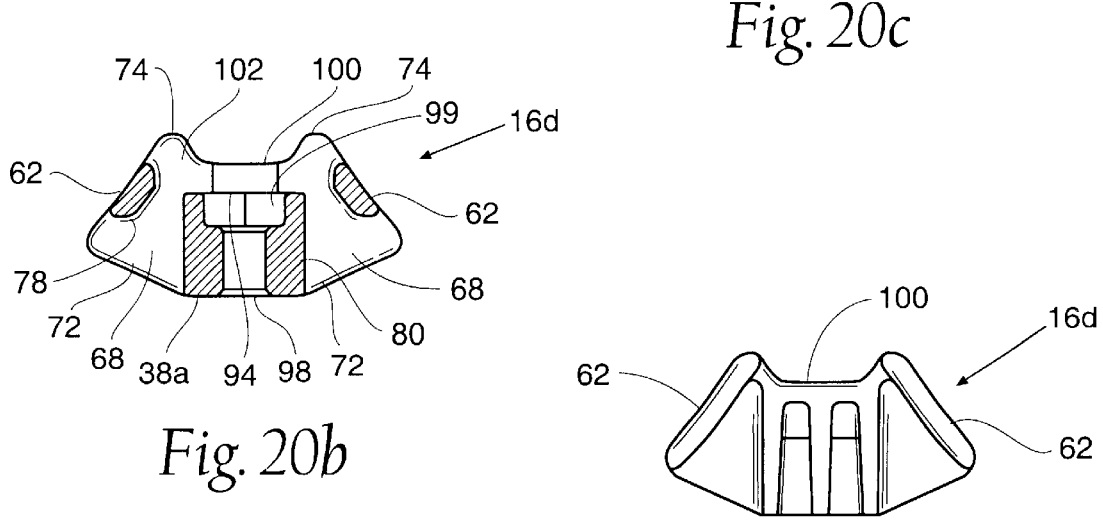
Fig. 20b
Fig. 20d

SADDLE MOUNT

RELATED APPLICATION

This application claims the benefit of provisional application Ser. No. 60/232,360, filed Sep. 14, 2000.

BACKGROUND OF THE INVENTION

This invention generally relates to specialized mounts for use with cable ties and, more particularly, to a mount that can be secured with cable ties, frictional mounts or fasteners, to secure, for example, hose, wire, cable or tube bundles adjacent a structural member such as a vehicle frame rail, firewall, fender, body panel, bracket or other structural members.

Molded plastic cable ties are known in the art and are used to secure hoses, wires, cables, tubes, or other elongate items in tight bundles. Specialized button head ties are also known and serve to both secure the elongate items into bundles, and also to secure the resulting bundle to an adjacent structural member. Such ties typically include an elongate strap and a separate "button head". The strap encircles the items to be bundled and is secured at both ends by the button head and a wedged pawl. The button head, in turn, extends through and bears against a hole formed in the structural member.

Button head ties are effective, convenient and easy to use, however several problems have been noted when bundles having various functions are mounted in close proximity to one another. For example, a hot hose bundle mounted adjacent a cold hose bundle can create unwanted thermal transfer or higher current carrying lines located near lower voltage lower current lines may cause unwanted EMF transfer. Furthermore, a soft hose, such as neoprene hose, mounted along with one or more rigid items is likely to pinch or collapse when installers tighten the tie. In addition, abrasion resulting from jostling impact motion over time is likely to occur. Also, if the bundle is too heavy, a button head cable tie, used alone, is unable to hold the bundle satisfactorily. For example, a sharp burr edge on one or more mounting holes can cut into and eventually cut through the tie strap as a result of jostling impact loads on the bundle. Another drawback of using a button head tie is that the button head tie often does not provide adequate spacing from the structural member. In this case, the bundle may be in contact with an exposed bolt or screw end and undesirably abrade the bundle surface. This creates the potential for dangerous consequences when a bundle of abraded wires comes in contact with one another causing short circuits. Also abrasion in pneumatic, hydraulic and freon lines will cause leaks which result in dangerous consequences.

In one embodiment, the present invention provides a saddle mount for use with button head ties and standard cable ties. The saddle mount serves as an additional bundle cradle, support, separator and stand-off that works in conjunction with a tie strap to ameliorate the above-noted problems.

In other embodiments, the present invention provides a saddle mount having an integral mounting member for attachment to a structural member. The integral mounting member may be a fir tree mount, screw mount, smooth shaft, threaded shaft or other similar functioning member. The saddle mount serves as an additional bundle cradle, support, separator and stand-off that works in conjunction with one or more standard cable ties.

In yet other embodiments, the present invention provides a saddle mount having an aperture for receiving a mounting member. The mounting member may be a bolt, screw or other fastener. In one specific embodiment, provision is made for the fastener head to interlock within the saddle mount thereby eliminating the need to hold the fastener with a wrench during installation.

SUMMARY OF THE INVENTION

In one embodiment, the invention provides a mounting assembly for use in connection with conventional cable ties and button head-type cable ties. The assembly includes a saddle mount component having at least one opening there through, and further includes a base surface and one or more support or arched surfaces. The saddle mount is preferably interposed between one or more items to be secured and a structural member. The main opening is smooth-walled and substantially funnel-shaped in cross section. The support or arched surface is arranged to cradle, support, separate and stand-off bundled items, with a base or mounting surface adapted for supporting engagement with the structural member.

A button head tie is essentially a plastic tie strap product constructed from two individual pieces, a strap and a button head. The strap is molded with a tail finger grip on one end and a wedge shaped pawl on the other end that locks into the button head. Serrations extend the length of the strap and all features are duplicated on both sides. The button head may be round or rectangular with an aperture in the middle to accept the strap. The wedge shaped pawl has teeth on it that engage with serrations on the strap when it is looped back through the aperture of the head. The head aperture provides two angled surfaces that match the angles of the wedge shaped pawl. When the teeth are engaged and the bundle becomes tight the wedge shaped pawl is driven downward into the head pinching and locking against the strap. The button head tie is considered bi-directional because all the features are duplicated on both sides and the strap may be looped in either direction, which makes the assembly easier.

In other embodiments, the invention provides a mounting assembly having an integrally formed mounting member. The mounting assembly provides structure for use with conventional cable ties. The saddle mount is preferably interposed between one or more items to be secured and a structural member. The mount assembly includes a base surface and one or more saddle or arched surfaces. The mounting member extends from the base surface. The saddle or arched surface is arranged to cradle, support, separate and stand-off bundled items, with a mounting surface adapted for supporting engagement with the structural member.

In yet other embodiments, the present invention provides a saddle mount having an aperture for receiving a mounting member. The mounting member may be a bolt, screw or other fastener. In one specific embodiment, provision is made for the fastener head to interlock within the saddle mount thereby eliminating the need to hold the fastener with a wrench during installation.

It is an object of the present invention to provide a mounting assembly that is convenient to use and economical in manufacture.

It is a further object of the present invention to provide a mounting assembly for use with a button head-type cable tie to provide spaced-apart cradling support alongside a structural member or with an integral mounting member to provide spaced-apart cradling support alongside a structural member.

It is a further object of the invention to provide a mounting assembly for use with conventional cable ties that reliably and effectively secures elongate items into bundles alongside a structural member.

It is yet another object of the invention to provide a mounting assembly having a plurality of support or arched surfaces arranged for cradling multiple elongate bundled items.

It is yet another object of the invention to provide a mounting assembly that can be connected to a structural supporting member in a variety of manners.

DESCRIPTION OF THE DRAWINGS

FIG. 14c is a top plan view of the saddle mount shown in FIG. 14a.

FIG. 14d is a front elevational view of the saddle mount shown in FIG. 14a.

FIG. 14e is a side elevational view of the saddle mount shown in FIG. 14a.

FIG. 14f is a bottom plan view of the saddle mount shown in FIG. 14a.

FIG. 15 is a side elevational view of a mounting assembly including the alternate embodiment saddle mount shown in FIGS. 14a–14f with the supporting structural member and bundled objects shown in phantom.

FIG. 16c is a top plan view of the saddle mount shown in FIG. 16a.

FIG. 16d is a front elevational view of the saddle mount shown in FIG. 16a.

FIG. 16e is a side elevational view of the saddle mount shown in FIG. 16a.

FIG. 16f is a bottom plan view of the saddle mount shown in FIG. 16a.

FIG. 17 is a side view of a mounting assembly including the alternate embodiment saddle mount shown in FIGS. 16a–16f with the supporting structural member, bundled objects, and attaching nut shown in phantom.

FIG. 18a is a perspective view of another alternate embodiment saddle mount with attaching hex screw and nut shown in phantom.

FIG. 18b is a longitudinal section of the saddle mount shown in FIG. 18a and taken along lines 18b—18b thereof.

FIG. 18c is a top plan view of the saddle mount shown in FIG. 18a.

FIG. 18d is a front elevational view of the saddle mount shown in FIG. 18a.

FIG. 18e is a side elevational view of the saddle mount shown in FIG. 18a.

FIG. 18f is a bottom plan view of the saddle mount shown in FIG. 18a.

FIG. 20a is a perspective view of a further alternate embodiment saddle mount with attaching hex screw and nut shown in phantom.

FIG. 20b is a longitudinal section of the saddle mount shown in FIG. 20a and taken along lines 20b—20b thereof.

FIG. 20c is a top plan view of the saddle mount shown in FIG. 20a.

FIG. 20d is a front elevational view of the saddle mount shown in FIG. 20a.

FIG. 20e is a side elevational view of the saddle mount shown in FIG. 20a.

FIG. 20f is a bottom plan view of the saddle mount shown in FIG. 20a.

FIG. 22c is a top plan view of the saddle mount shown in FIG. 22a.

FIG. 22d is a front elevational view of the saddle mount shown in FIG. 22a.

FIG. 22e is a side elevational view of the saddle mount shown in FIG. 22a.

FIG. 22f is a bottom plan view of the saddle mount shown in FIG. 22a.

DETAILED DESCRIPTION

Figure 1:
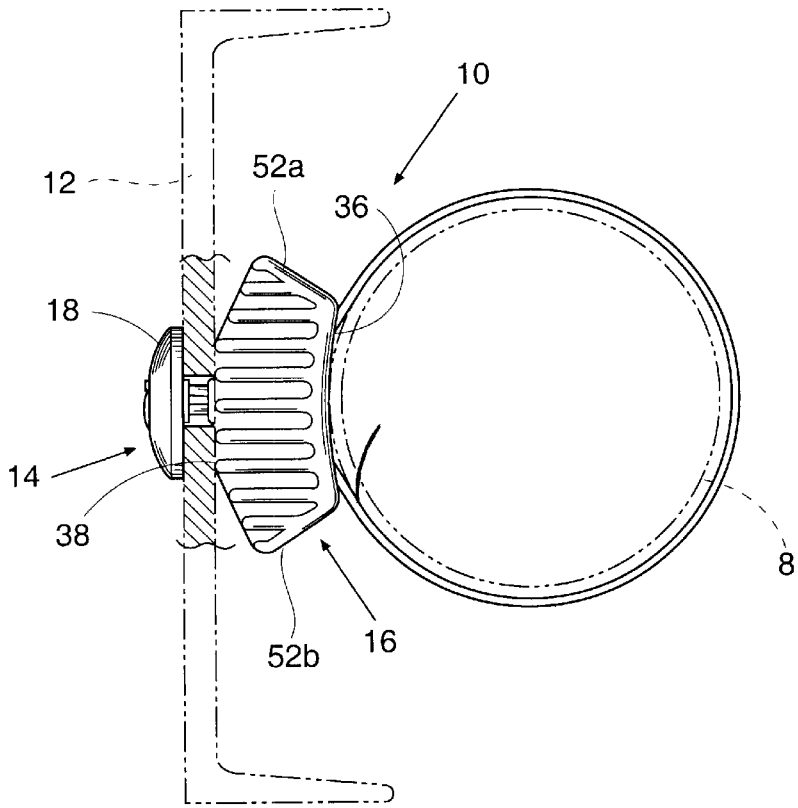
FIG. 1 is a side elevational view of the mounting assembly with bundle and supporting structural member shown in phantom.

Although the disclosure hereof is detailed and exact to enable those skilled in the art to practice the invention, the physical embodiments herein disclosed merely exemplify the invention that may be embodied in other specific structure. While the preferred embodiment has been described, the details may be changed without departing from the invention, which is defined by the claims.

Like features and structural elements are referred to by like reference characters.

Figure 2:
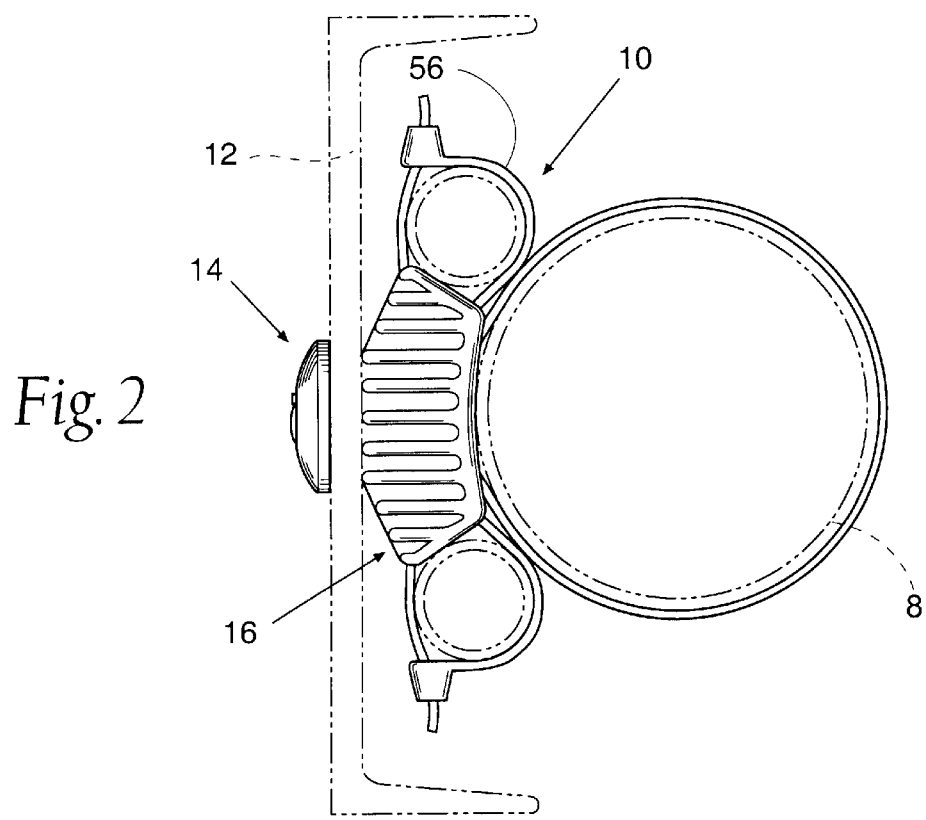
FIG. 2 is a side elevational view of the mounting assembly including a plurality of bundles positioned in adjacent relationship and shown in phantom.
Figure 3:
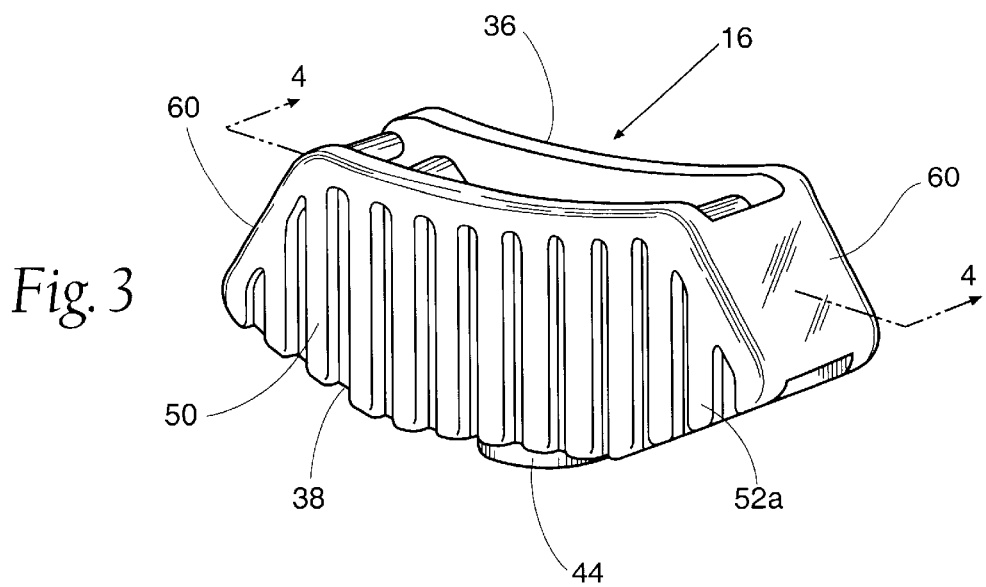
FIG. 3 is a perspective view of an embodiment of the novel saddle mount of this invention.

Referring to the drawings, and, in particular to FIGS. 1 and 2, a mounting assembly 10 embodying the various features of the invention is shown. The assembly 10 functions to secure elongate items, such as hoses, wires, cables, tubes and the like, into bundles 8 (shown in phantom) and to secure the bundles 8 to an adjacent structural member 12. It will be apparent that a "bundle" may comprise multiple wires or cables that are flexible or rigid, hot or cold, or fluid transporting hoses or tubes. Some elongate items may also be contained within the bore of a conventional tubular conduit. The assembly 10 is particularly well suited for use in the transportation industry where it can be used to secure wiring harnesses to a structural member such as a vehicle frame rail, firewall, fender, body panel, bracket or other structural members.

Figure 7:
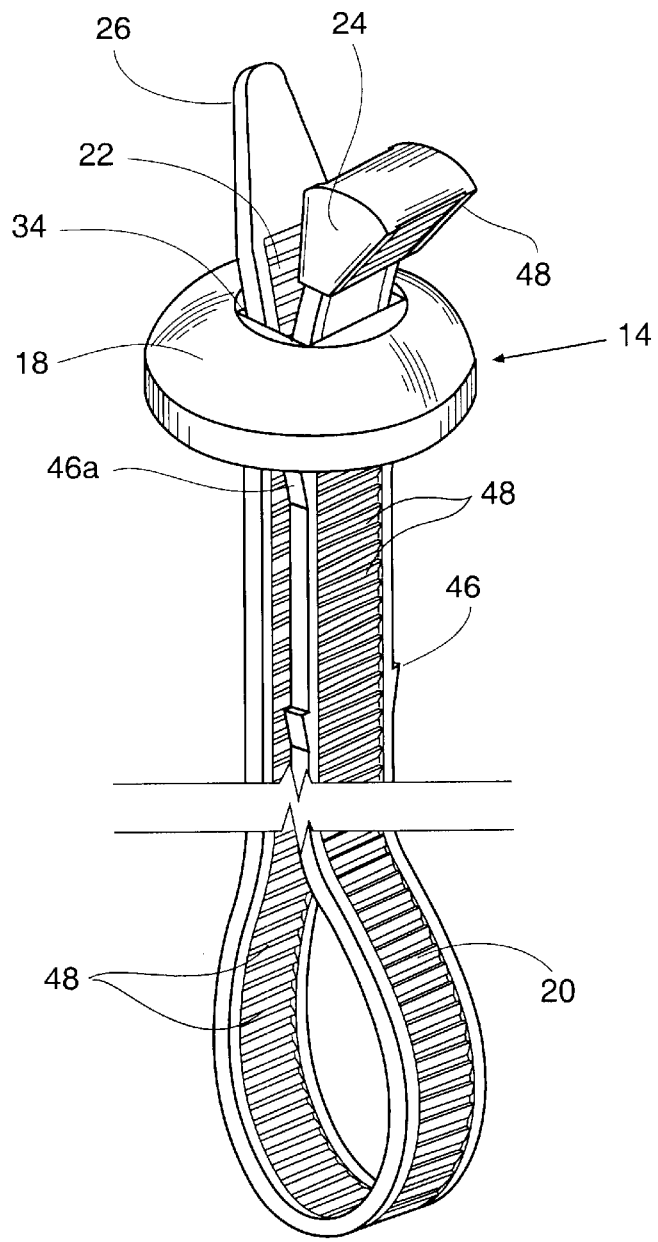
FIG. 7 is a perspective view of a button head tie.
Figure 7A:
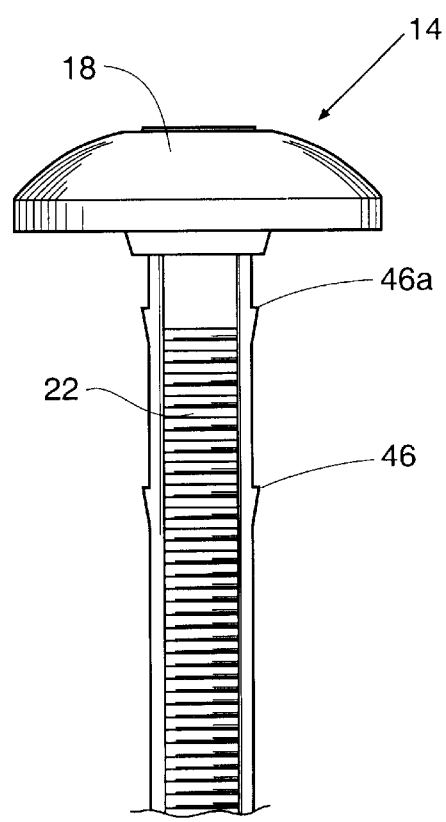
FIG. 7a is a front elevational, fragmentary, view of the button head tie.
Figure 7B:
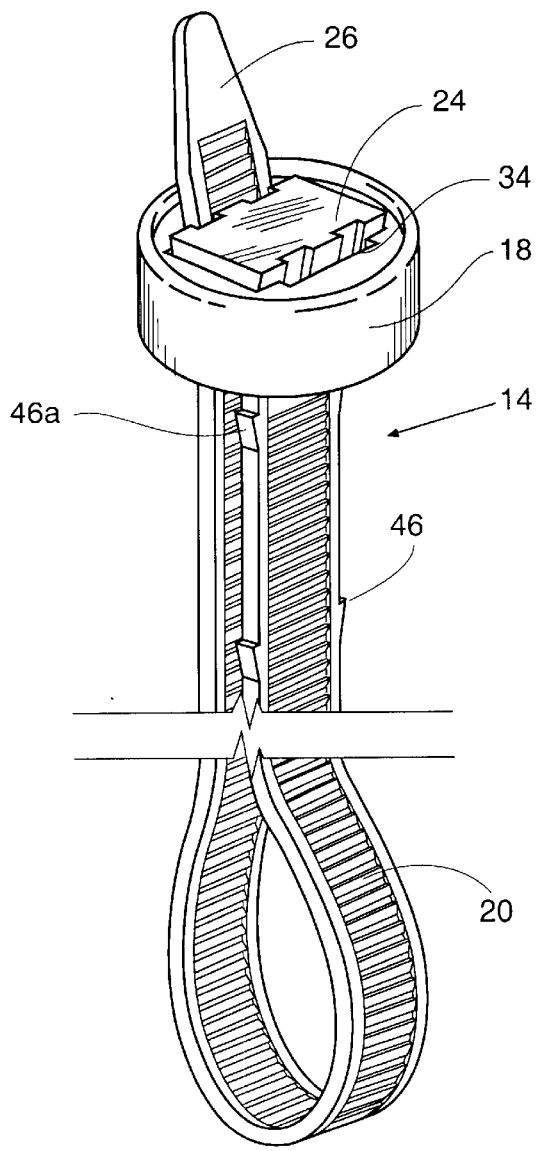
FIG. 7b is a perspective view of an alternate embodiment button head tie.
Figure 7C:
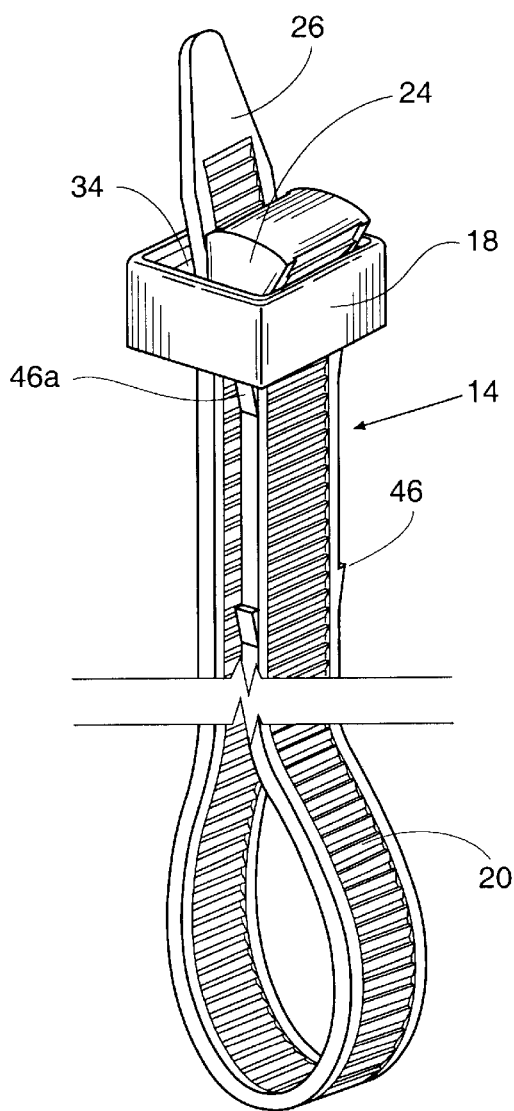
FIG. 7c is a perspective view of another alternate embodiment button head tie.

As illustrated, in the views of FIGS. 1 and 2, the assembly 10 includes two principal components, namely a buttonhead-type tie 14 and a saddle mount 16. With reference to FIGS. 7–13, the buttonhead-type tie 14 is seen in greater detail and comprises a button head 18 and an elongate strap 20. The elongate strap 20 comprises a flat, ribbon-like element with teeth serrations 22 and includes an integrally formed, wedge-shaped locking pawl 24 at one end. The opposite end or strap tail 26 is preferably tapered. As seen in FIGS. 7 and 9, the buttonhead 18 is generally disc shaped. However, as shown in FIGS. 7b and 7c, the buttonhead 18 shape may vary. The buttonhead 18 is configured to extend part way through an aperture or hole 28 formed in the structural member 12. To aid in assembly and alignment, the buttonhead 18 may include a narrow portion or pilot bushing 30, best seen in FIGS. 10–13, and a wider portion or rim 32. The pilot bushing 30 is sized to fit within the aperture 28, of supporting member 12, while the rim 32 is large enough to keep the buttonhead is 18 from passing through the aperture 28. The buttonhead 18 further includes a central aperture 34 extending through both the pilot bushing 30 and the rim 32. Preferably the components for the buttonhead tie 14, head 18 and strap 20, seen in FIGS. 7–7c, are each injection molded from a strong, durable plastic, such as Nylon 6/6.

Figure 4:
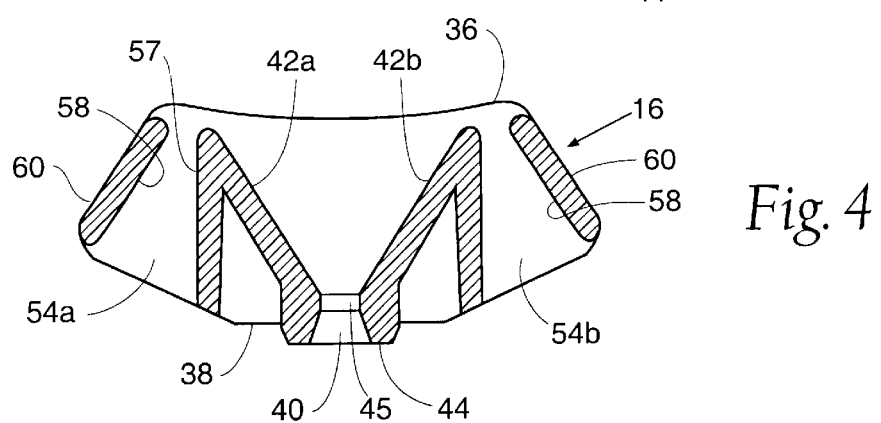
FIG. 4 is a longitudinal section of the saddle mount and taken along lines 4—4 of FIG. 3.
Figure 5:
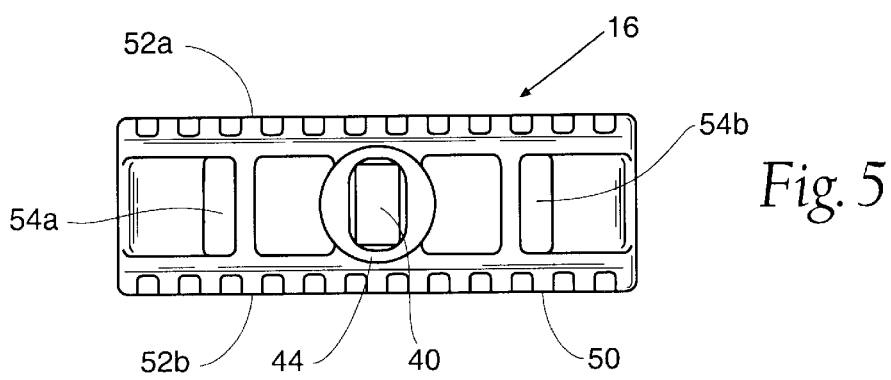
FIG. 5 is a bottom plan view of the saddle mount shown in FIG. 3.
Figure 6:
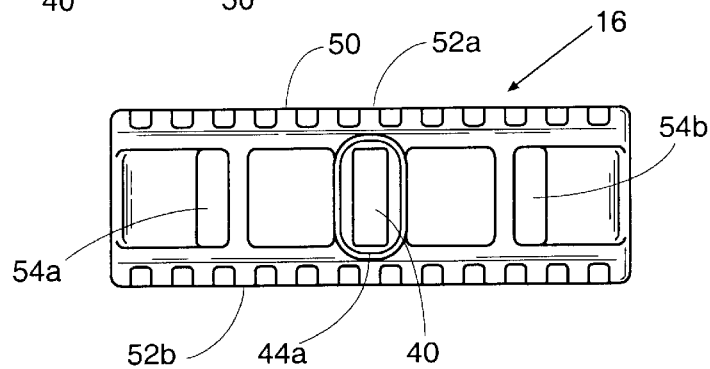
FIG. 6 is a bottom plan view of the saddle mount, similar to the view of FIG. 5, but showing an oval pilot bushing.

Referring now to FIGS. 3–6, it can be seen that the first embodiment of the saddle mount 16 is integrally formed and comprises a support or arched surface 36 and a base surface 38. The support or arched surface 36 is arranged for supporting or cradling engagement of a bundle 8 (see FIGS. 1 and 2) while the base surface 38 mates with the structural member 12. The saddle mount 16 is further provided with a main aperture 40 to receive the elongate strap 20 of button head tie 14. As best seen in FIG. 4, the aperture 40 is a funnel-shaped section having inwardly tapered, opposed aperture surfaces 42a, 42b so as to direct the elongate strap 20 (not shown in this view) through the aperture 40. The funnel-shaped section of aperture 40 allows for a varying range of bundle diameters. As illustrated, the distended end of the tapered aperture 40 opens toward the saddle or arched surface 36 and the supported bundle 8, while the constricted end of the aperture 40 terminates beyond the base surface 38 and through the pilot bushing 44. The constricted end of the aperture 40 is arranged to be in coaxial alignment with the aperture 28 in structural member 12 (see FIG. 12). The narrow end of aperture 40 is further provided with the pilot bushing 44 which centers strap 20 in aperture 12 and prevents strap 20 from being cut into or cut through by any sharp burr edges in aperture 12. As seen in FIG. 5, the bushing 44 is of a generally circular configuration; however, it is to be understood that any other shape may be used, such as the oval configuration shown in FIG. 6 and referenced as numeral 44a. A non-circular configuration such as the oval bushing 44a seen in FIG. 6 is preferred when a positive orientation of the saddle 16 would aid in the assembly of the elongate items 8.

Referring again to FIGS. 3–6, and in accordance with another aspect of the invention, a plurality of ribs or grooves 50 may be provided on two sides of the saddle mount 16. Preferably, the ribs 50 extend laterally across side surfaces 52a, and 52b. The ribs 50 are dimensioned so as to provide greater surface area for surfaces 36 and 38. The ribs 50 further provide added strength for the saddle mount element 16. They also minimize the amount of material needed for manufacture of the saddle mount element 16. Alternatively, an extended lip could be formed along surfaces 36 and 38 to increase their respective surface areas. This too would increase the surface area contact for the supported bundle.

As seen in FIGS. 3–6, inclusive, the saddle mount 16 is further provided with secondary apertures 54a, 54b. Secondary apertures 54a, 54b provide passageways through the saddle mount 16 for additional cable ties 56 (as seen in FIG. 2). Conventional cables ties 56 may be used, for example, if it is necessary for additional bundles to be secured independently of the primary bundle 8 (see FIGS. 1 and 2), or if it is necessary to add other elongate items at a later time. As illustrated in FIG. 4, it can be seen that the secondary apertures 54a, 54b are of a funnel-shaped section, each having an inner wall 57 and an outer wall 58. The exterior surfaces 60 of outer walls 58 are shaped to supportingly cradle additional bundles when secured independently of the primary bundle 8 by conventional cable ties 56 (see FIG. 2). These exterior surfaces are wide and create broad surface contact with the bundle 8 to minimize pinching and crushing of the bundle 8.

Figure 8:
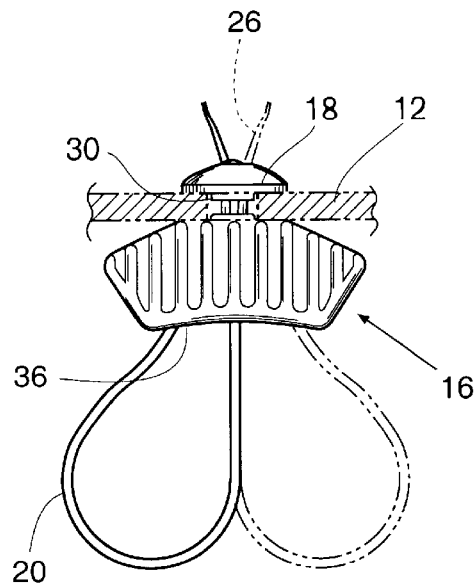
FIG. 8 is a side elevational view of the button head tie and saddle mount showing the tie and mount in place on a structural member.
Figure 8A:
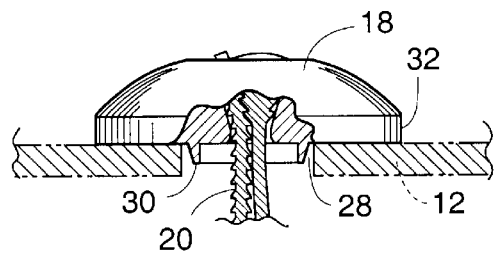
FIG. 8a is an enlarged, partially cut away view of the button head tie shown in FIG. 8 after the tie tail has been trimmed.
Figure 9:
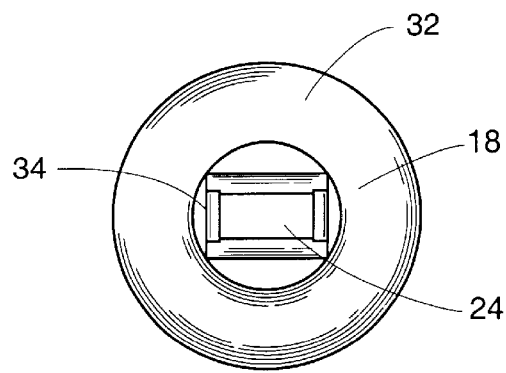
FIG. 9 is a top plan view of the button head tie shown in FIG. 8.
Figure 12:
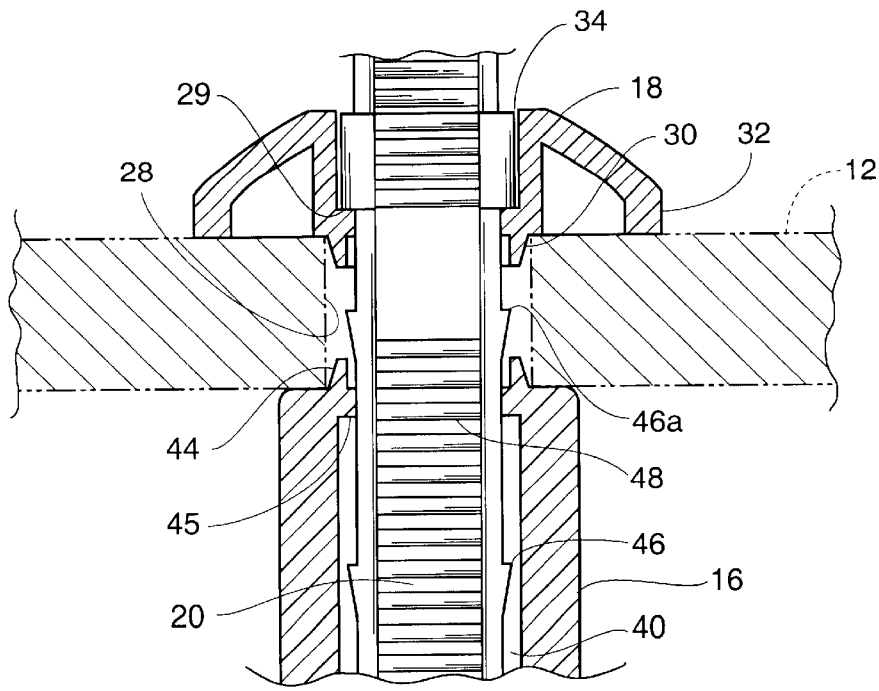
FIG. 12 is a cross-sectional, fragmentary, view of the button head tie and saddle mount showing the tie and mount in place on a supporting structure.
Figure 13:
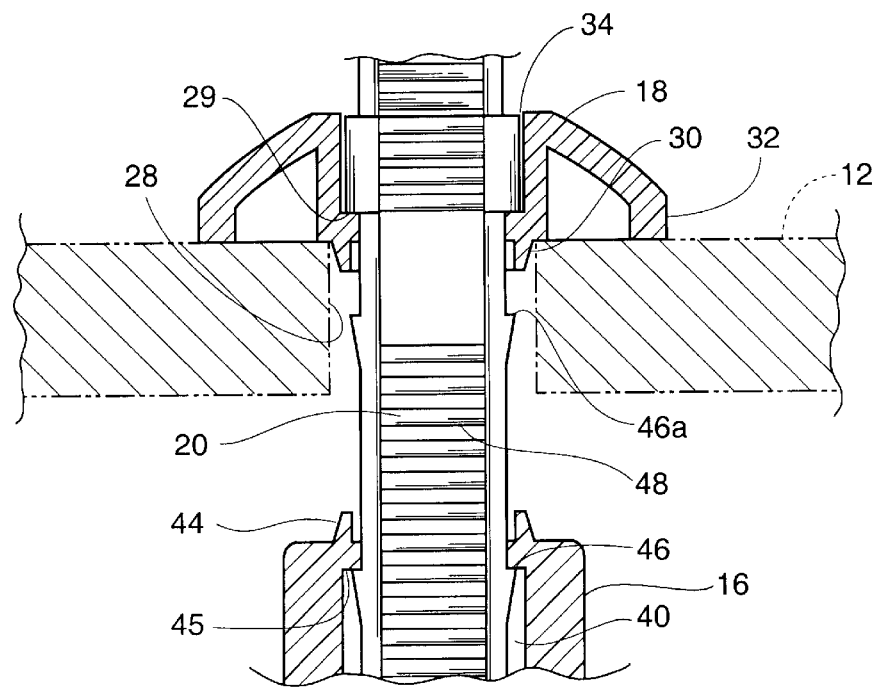
FIG. 13 is a cross-sectional, fragmentary, view of the button head tie engaged with the saddle mount prior to final assembly.

With reference to FIGS. 8, 12 and 13, when the button head tie 14 is installed into the aperture 28 in structural member 12, the aperture 34 provides a passageway through the button head 18 and the structural member 12 as well. In accordance with one aspect of the invention, the tapered aperture 34 is smooth-walled and is free of serrations, teeth, projections or other discontinuities except for the strap-retaining ledge 29. The strap 20 is inserted through the aperture 28 in structural member 12, with the tail end 26 foremost, and then through the constricted end of the aperture 40 in saddle mount 16. A first pair of strap retainers 46 extend laterally from opposed sides of strap 20, adjacent the wedge-shaped pawl 24 and allow the strap 20 to be inserted through aperture 28 and then through the constricted end of aperture 40. The retainer 46 is then snapped into place under ledge 45 locking the button head strap 20 into the saddle 16. Because the strap 20 is locked into the saddle 16, the strap 20 is prevented from withdrawal back through aperture 28 after insertion. This aids the assembly procedure by freeing up the installer's hands thereby making it easier for the installer to wrap the strap around the bundle and thread the tail back through the opening. This also allows the button head ties 14 and saddle mounts 16 to be pre-assembled to a structural member prior to cables, hoses, wires and tubing being brought in for final assembly.

A second pair of strap retainers 46a is located intermediate the first pair of strap retainers 46 and the button head 18. This keeps the button head 18 close to the wedge-shaped head 24 prior to use. The spacing between the first pair of strap retainers 46 and the second pair of strap retainers 46a permits a large variance in accommodating various structural member 12 thicknesses.

As best seen in FIGS. 1 and 2, to secure a bundle 8, the strap 20 is looped around the bundled items 8 and the tail 26 (seen in FIG. 7) of the strap 20 is passed back into the saddle 16 through the distended, funnel-shaped aperture formed by walls 42a and 42b. At this stage, the tail 26 is self-guided through aperture 40 in the saddle 16, aperture 28 in the structural member 12 and aperture 34 in the button head 18. This makes the installation process much easier because the installer does not have to guide the tie tail 26.

Because a plurality of teeth or serrations 48 are provided on both sides of the strap 20, as well as on both sides of the wedge-shaped pawl 24, the buttonhead tie 14 is considered to be bi-directional, meaning the tie strap 20 can be fed from either direction back into the button head 18 (see FIG. 8). In addition, the saddle mount 16 surfaces 42a and 42b contribute to the bi-directionality making it easier for the assembler to wrap and secure each bundle without the need to identify which side of the strap the serrations are on. This reduces installation time and avoids the possibility of an incorrect installation that initially escapes notice but releases after time.

Figure 10:
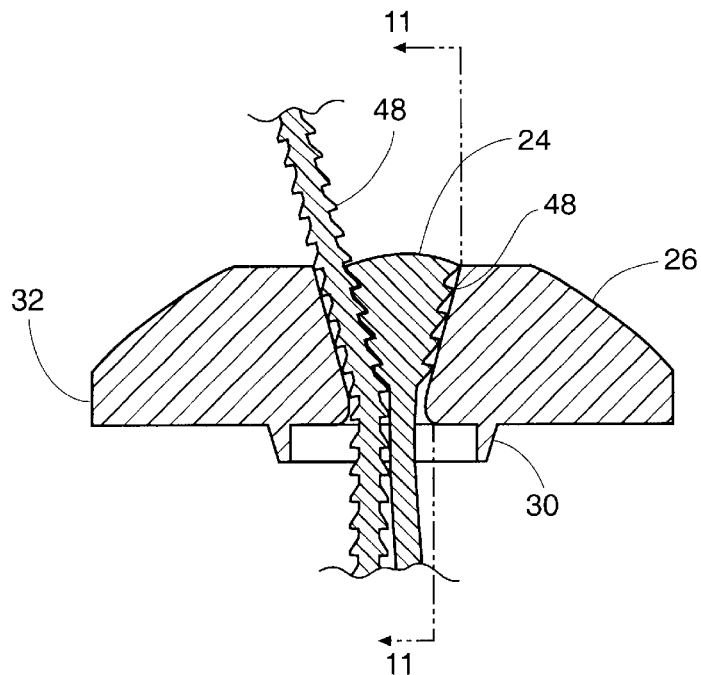
FIG. 10 is a sectional, fragmentary, view of the button head tie seen in FIG. 8 and showing the strap fully engaged in the button head.

Preferably, the serrations 48 extend transversely across the strap 20 and pawl 24. As seen in FIG. 10, the teeth 48 on the sides of the strap 20 and the sides of the pawl 24 are shaped and dimensioned to interlock with each other to permit movement past each other in one direction, but to resist movement past each other in the opposite direction.

Figure 11:
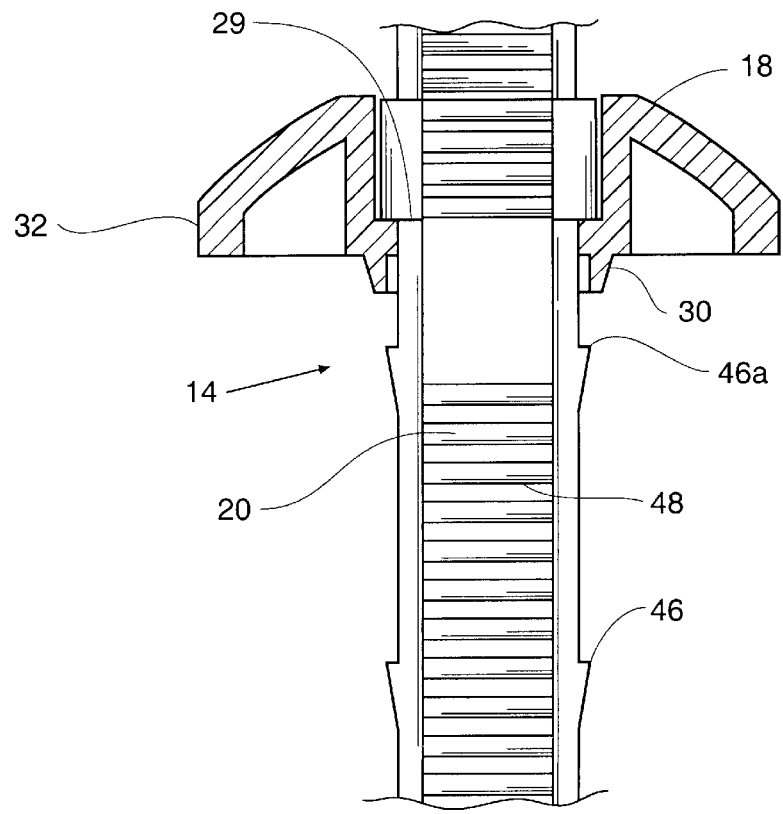
FIG. 11 is a cross-sectional view of the button head tie shown in FIG. 10 and taken along line 11—11 thereof.

Referring further to FIG. 8, when the tail 26 of the strap 20 is looped around the bundle 8, as seen in FIGS. 1 and 2, and reinserted through the distended, funnel shaped aperture 40 (seen in FIG. 4) of saddle mount 16 and into button head 18, it is then pulled tightly through the button head 18. This has the effect of drawing the wedge-shaped pawl 24 downwardly into the button head aperture 34 pinching and locking it against the strap 20 as seen in FIGS. 10, 11 and 12. This has the further effect of drawing the elongate items to be secured into a tight bundle and has the further effect of drawing the resulting bundle 8 tightly against the saddle or arched surface 36 of the saddle mount 16, as seen in FIGS. 1 and 2. This keeps the bundle 8 securely fastened to the structural member 12 maintaining a spaced-apart relationship. The support or arched surface 36 is wide with broad surface contact to minimize pinching and crushing of the bundle 8. After the strap 20 has been tightened, the tail 26 and excess strap length 20 can be clipped off close to the button head 24 to make a clean installation.

Figure 14A:
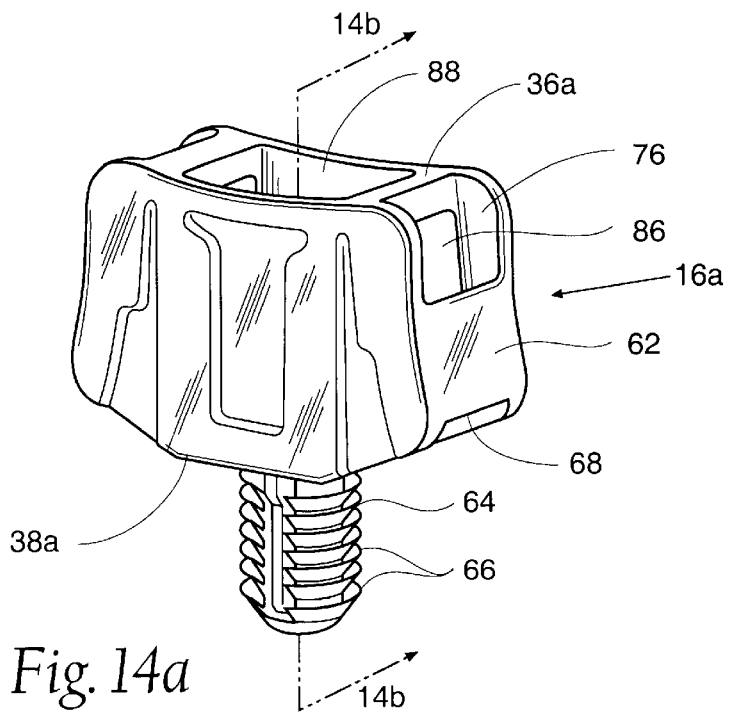
FIG. 14a is a perspective view of an alternate embodiment saddle mount.
Figure 14B:
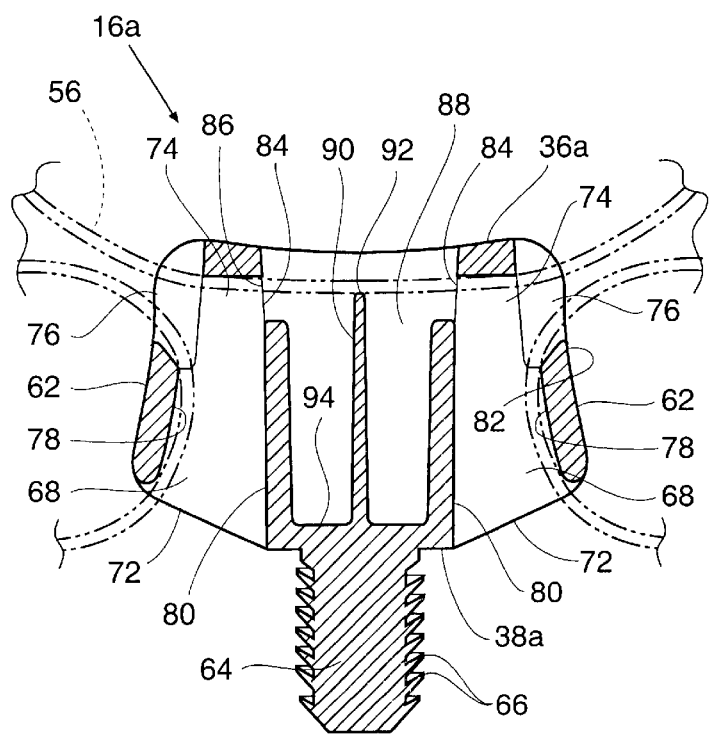
FIG. 14b is a longitudinal section of the saddle mount shown in FIG. 14a and taken along lines 14b—14b thereof.
Figure 14C:
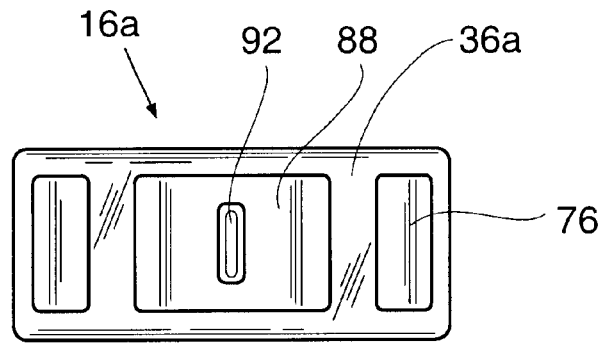
Figure 14D:
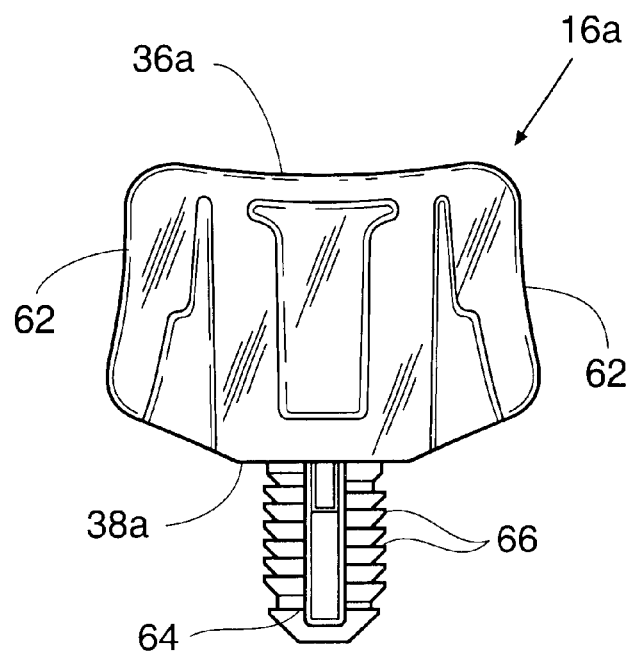

Referring now to FIGS. 14a–14f and 15, an alternate embodiment saddle mount 16a, may be seen. Saddle mount 16a is integrally formed and, as seen particularly in FIG. 15, is to be used with conventional cable ties 56. Saddle mount 16a comprises a center saddle or arched surface 36a and a base surface 38a. The center saddle or arched surface 36a is arranged for supporting engagement of a bundle 8, as shown in phantom in FIG. 15, while the base surface 38a mates with the structural member 12. The saddle mount 16a is further provided with a pair of side support or arched surfaces 62. As seen in FIG. 15, side supports 62 provide mounting for additional bundles 8. The base surface 38a is further provided with a fir tree mount 64 having a plurality of branches, or barbs 66. As illustrated in FIG. 15, the fir tree mount 64 is arranged to be in coaxial alignment with the aperture 28 in structural member 12. Branches 66 have a predetermined pitch that is staggered to provide more frequent pull-out resistance. As seen, particularly in FIG. 14b, the saddle mount 16a is further provided with a pair of side passages 68 for receiving and guiding a respective cable tie 56 (as seen in FIG. 15). Best seen in FIG. 14b, each side passage 68 is provided with a distended end 72 and a constricted end 74. Each distended end 72 opens toward the base surface 38a, while each constricted end 74 terminates at a respective side aperture 76. As further seen in FIG. 14b, each side passage 68 includes an inwardly tapered outer wall surface 78 and an inner wall surface 80. The inner wall surfaces 80 extend substantially parallel to the axis of the fir tree mount 64. The exterior surface 82 of each outer wall surface 78 corresponds to the side support arched surfaces 62. Further, the constricted end 74 of each side passage 68 is respectively provided with an inner aperture 84. The inner apertures 84 and side apertures 76 are arranged to be in longitudinal alignment and thereby provide a throughway 86 for receiving and guiding the cable tie 56 used to securely engage a bundle 8 to arched center support surface 36a. Cable ties 56 passing through side passages 68 secure bundles 8 to a respective side support 62. As illustrated in FIG. 14b, it can be seen that the throughway 86 is perpendicular with the tree mount 64. The saddle mount 16a is further provided with a pocket or re-entrant bore 88 having an upstanding tension tab 90 attached to base 94. As shown in FIG. 14b, the distal end 92 of tension tab 90 is free to flex and applies a small amount of friction to the conventional cable tie 56 inserted in throughway 86 and holds the cable tie in a pre-assembled, ready position prior to surrounding bundles 8 by the cable tie.

Figure 16A:
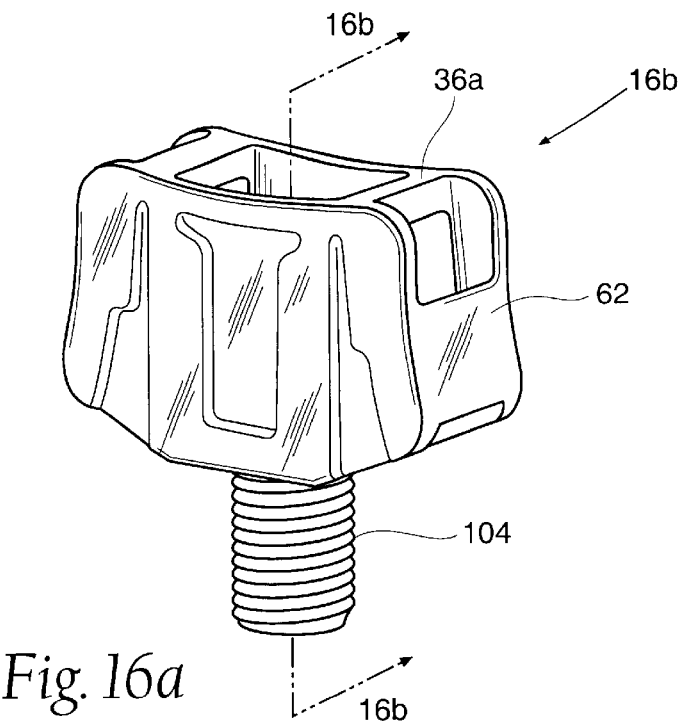
FIG. 16a is a perspective view of another alternate embodiment saddle mount with integrally formed screw mount.
Figure 16B:
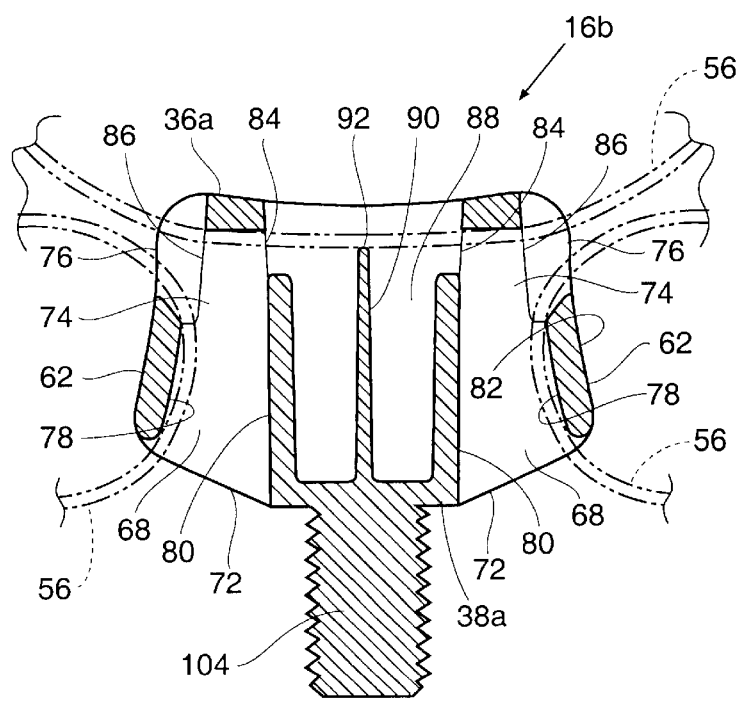
FIG. 16b is a longitudinal section of the saddle mount shown in FIG. 16a and taken along lines 16b—16b thereof.

Referring now to FIGS. 16a–16f and 17, another embodiment saddle mount 16b may be seen. Saddle mount 16b is integrally formed and; as seen particularly in FIG. 17, is to be used with conventional cable ties 56. Saddle mount 16b comprises a center support or arched surface 36a and a base surface 38a. The center support or arched surface 36a is arranged for supporting engagement of a bundle 8, as shown in phantom in FIG. 17, while the base surface 38a mates with the structural member 12. The saddle mount 16b is further provided with a pair of side support or arched surfaces 62. As seen in FIG. 17, side supports 62 provide mounting for additional bundles 8. The base surface 38a is further provided with an integrally formed, threaded bolt mount 104. As illustrated in FIG. 17, the bolt mount 104 is arranged to be in coaxial alignment with the aperture 28 in structural member 12 and may be secured using a conventional nut 96 (seen in phantom) or other attachment means. As seen, particularly in FIG. 16b, the saddle mount 16b is further provided with a pair of side passages 68 for receiving and guiding a respective cable tie 56 (as seen in FIG. 16b). Best seen in FIG. 16b, each side passage 68 is provided with a distended end 72 and a constricted end 74. Each distended end 72 opens toward the base surface 38a, while each constricted end 74 terminates at a respective side aperture 76. As further seen in FIG. 16b, each side passage 68 includes an inwardly tapered outer wall surface 78 and an inner wall surface 80. The inner wall surfaces 80 extend substantially parallel to the axis of the bolt mount 104. The exterior surface 82 of each outer wall surface 78 corresponds to the side saddle arched surfaces 62. Further, the constricted end 74 of each side passage 68 is respectively provided with an inner aperture 84. The apertures 84 and side apertures 76 are arranged to be in longitudinal alignment and thereby provide a throughway 86 for receiving and guiding the cable tie 56 used to securely engage a bundle 8 to arched center saddle surface 36*a* (seen best in FIG. 17). Cable ties 56 passing through side passages 68 secure bundles 8 to a respective side saddle 62. As illustrated in FIG. 16*b*, it can be seen that the throughway 86 is perpendicular with bolt mount 104. The saddle mount 16*b* is further provided with a pocket or re-entrant bore 88 having an upstanding tension tab 90 attached to base 94. As shown in FIG. 16*b*, the distal end 92 of tension tab 90 is free to flex and applies a small amount of friction to the conventional cable tie 56 inserted in throughway 86 and holds the cable tie in a pre-assembled, ready position prior to surrounding bundles 8 by the cable tie.

Figure 16C:
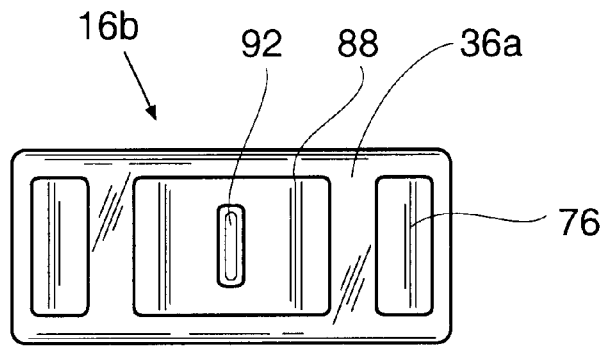
Figure 16D:
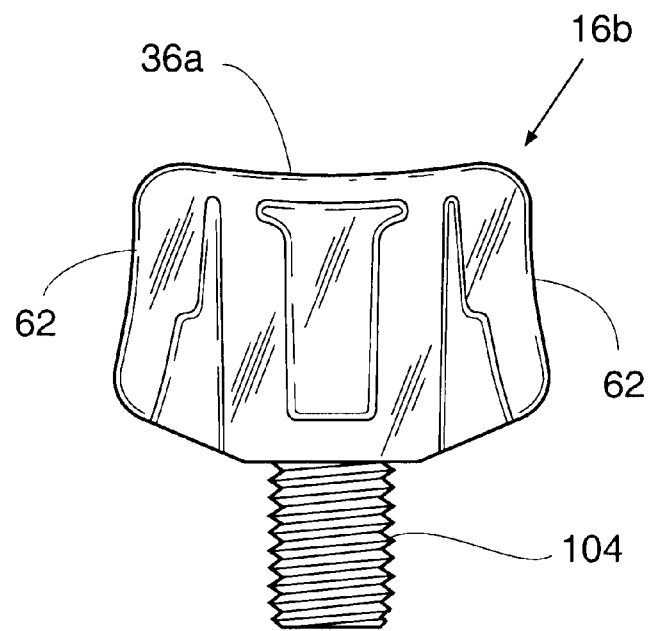
Figure 18E:
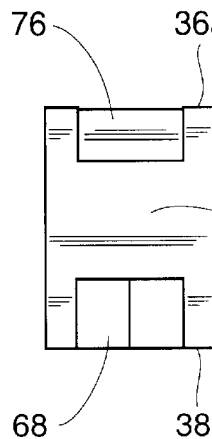
Figure 18F:
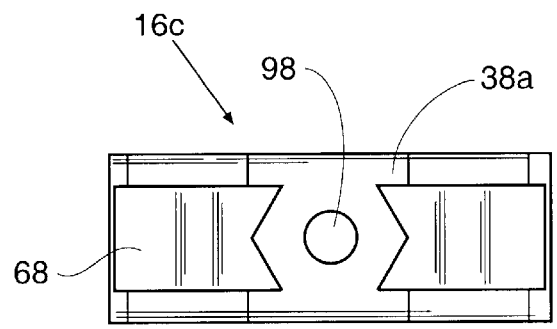
Figure 19:
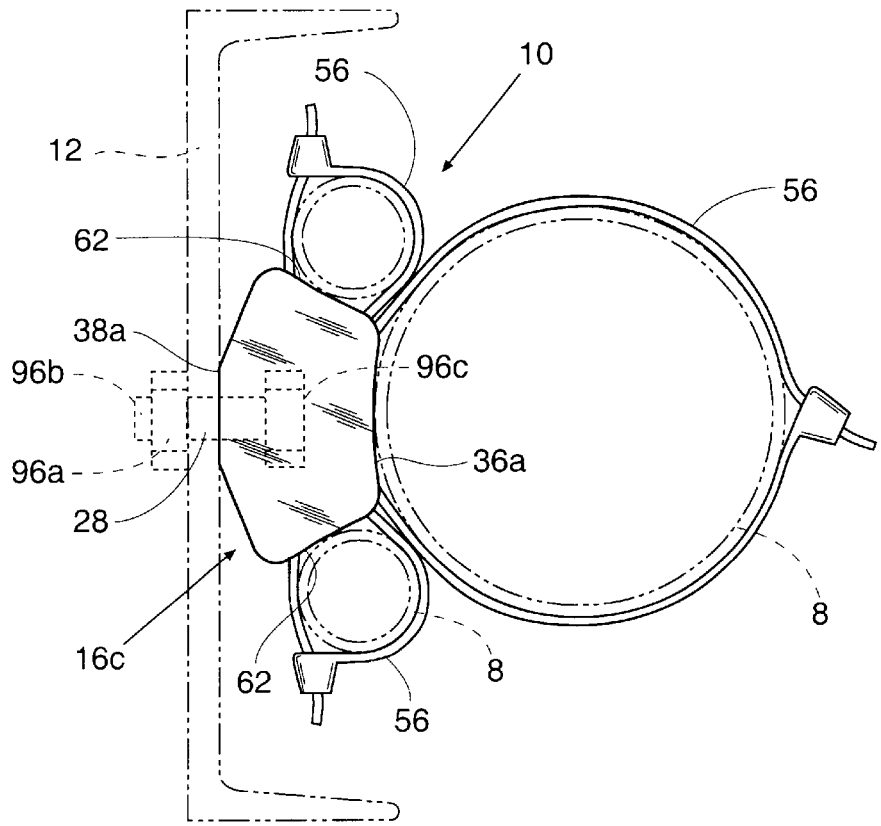
FIG. 19 is a side view of a mounting assembly including the alternate embodiment saddle mount shown in FIGS. 16a–16f with the supporting structural member and bundled objects shown in phantom.

Another alternate embodiment saddle mount 16*c* may be seen in FIGS. 18*a*–19, inclusive. Saddle mount 16*c* is integrally formed and is to be used with conventional cable ties 56. As in the embodiment shown in FIGS. 14*a*–15, the saddle mount 16*c* of this alternate embodiment comprises a center support or arched surface 36*a* and a base surface 38*a*. The center support or arched surface 36*a* is arranged for supporting engagement of a bundle 8, as shown in FIG. 19, while the base surface 38*a* mates with the structural member 12. The saddle mount 16*c* includes a through bore 94 to provide a passageway through the saddle mount 16*c* for attachment means, seen as a conventional nut and bolt combination 96*a*, 96*b* in FIG. 18*a*. It is to be understood that while the nut 96*a* and bolt 96*b* combination shown is the preferred attachment means, other attachment means known to those skilled in the art may be used. In accordance with one aspect of the invention, and as best seen in FIG. 18*b*, the through bore 94 is smooth walled and is free of serrations, teeth, projections or other discontinuities except for a constricted area of reduced diameter 98 and inner apertures 84 for the strap retaining throughway 86. The intersection of the constricted area 98 and through bore 94 provides a shoulder 99. The shoulder 99 serves as a support for the headed portion 96*c* of bolt 96*b*. Through bore 94 may further include a hexagonal profile as seen in FIG. 16*c* to accommodate a hex head portion 96*c* of bolt 96*b*. The attachment means (seen as a nut 96*a* and bolt 96*b* in FIG. 18*a*) is inserted through the through bore 94 and through the aperture 28 (see FIG. 19) in structural member 12 to provide support and securement to the structural member 12. Similarly to the embodiment seen in FIGS. 14*a*–15, the saddle mount 16*c* seen in the views of FIGS. 18*a*–19 is provided with a pair of side support or arched surfaces 62, and as seen in FIG. 19, provide mounting for additional bundles 8. The saddle mount 18*c* is likewise provided with a pair of side passages 68 and a throughway 86 for receiving respective cable ties 56 (seen in FIG. 19). As seen in FIG. 18*b*, each side passage 68 is provided with a distended end 72 and a constricted end 74. Each distended end 72 opens towards the base surface 38*a*, while each constricted end 74 terminates at a respective side aperture 76. As further seen in FIG. 18*b*, each side passage 68 includes an inwardly tapered outer wall surface 78 and an inner wall surface 80. The inner wall surfaces 80 extend substantially parallel to the axis of the through bore 94. The exterior surface 82 of each outer wall surface 78 corresponds to the side support arched surfaces 62.

Figure 20E:
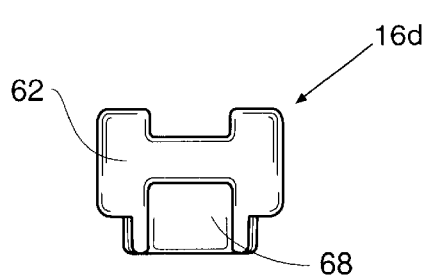
Figure 20F:
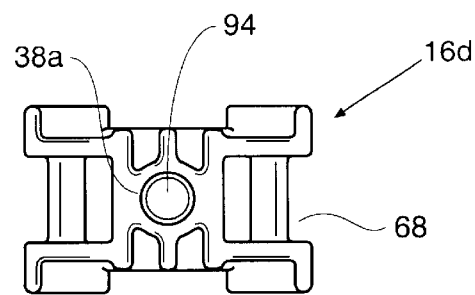
Figure 21:
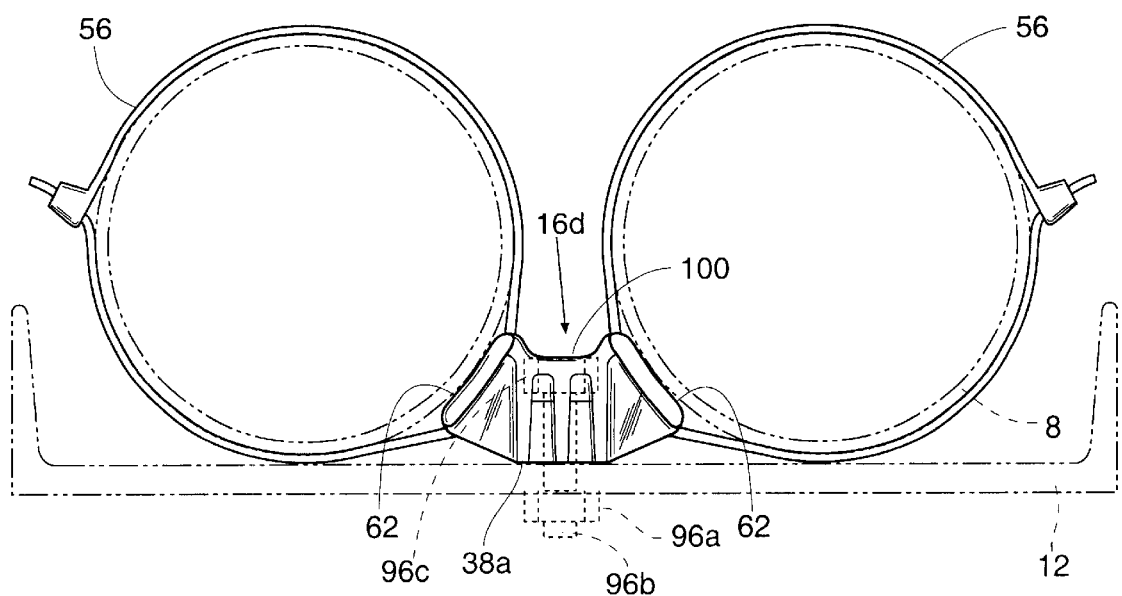
FIG. 21 is a side view of a mounting assembly including the alternate embodiment saddle mount shown in FIGS. 20a–20f with the supporting structural member and bundled objects shown in phantom.
Figure 22A:
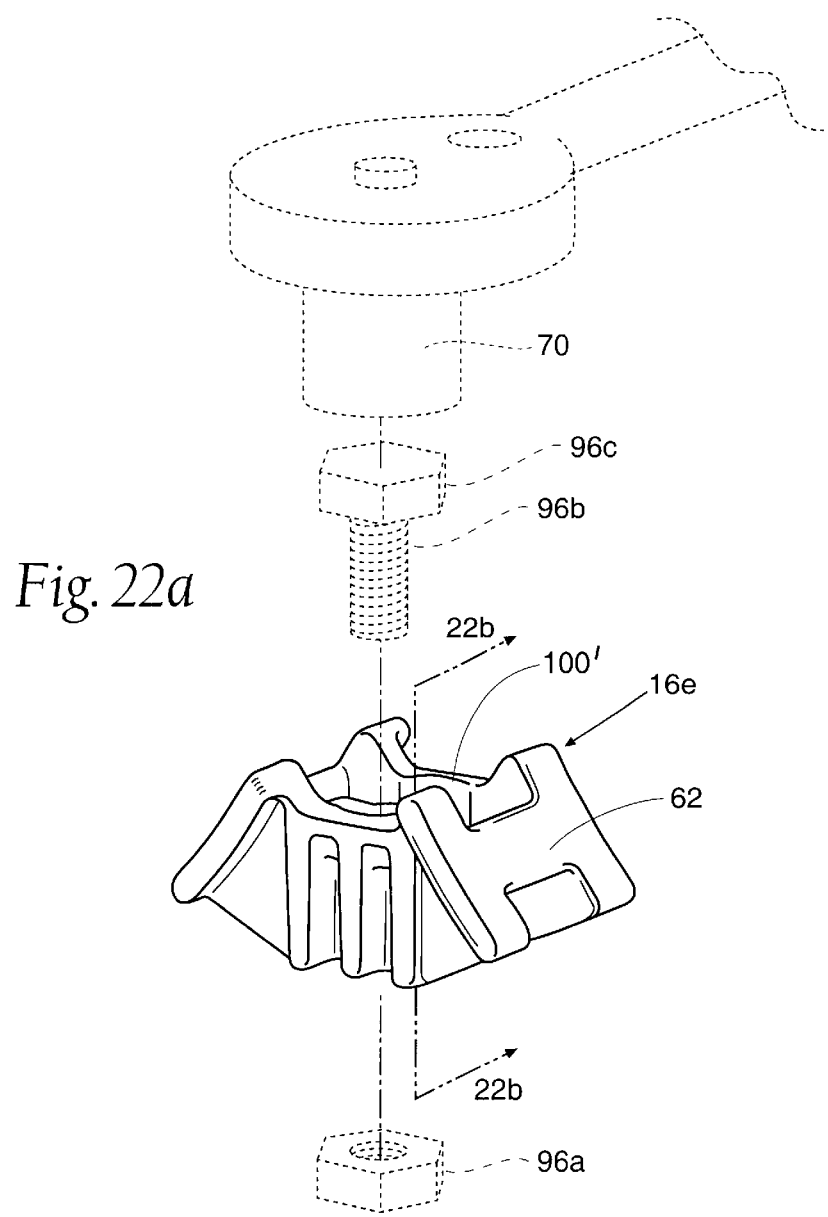
FIG. 22a is a perspective view of a further alternate embodiment saddle mount with attaching mechanism and hex bolt and nut shown in phantom.
Figure 22B:
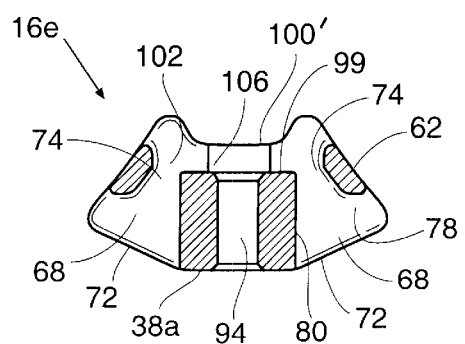
FIG. 22b is a longitudinal section of the saddle mount shown in FIG. 22a and taken along lines 22b—22b thereof.
Figure 22C:
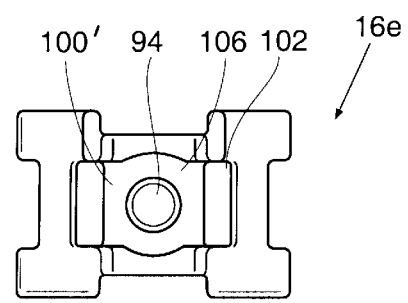
Figure 22D:
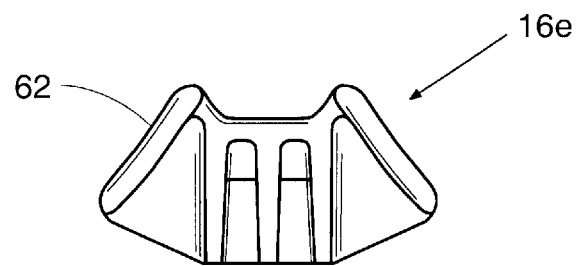
Figure 22E:
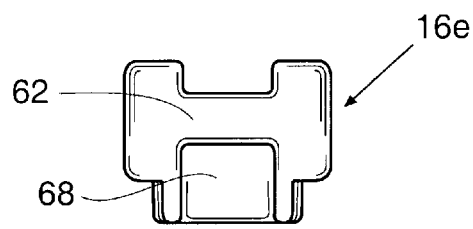
Figure 22F:
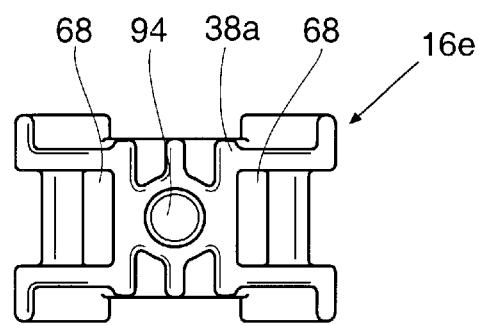

A further embodiment of the saddle mount, indicated by the reference numeral 16*d*, is seen in FIGS. 20*a*–21, inclusive. In this embodiment, the saddle mount 16*d* is provided with a pair of side support or arched surfaces 62, for mounting of bundles 8 (seen in FIG. 21), however the center support or arched surface 36*a*, seen in the previous embodiments is replaced by an intermediate area 100. Seen particularly in FIG. 20*b*, the saddle mount 16*d* is provided with a pair of side passages 68 for receiving and guiding respective cable ties 56 (see FIG. 21). Each side passageway 68 is provided with a distended end 72 and a constricted end 74. Each distended end 72 opens toward the base surface 38*a*, while each constricted end 74 terminates at a respective top aperture 102. As further seen in FIG. 20*b*, each side passage 68 includes an inwardly tapered outer wall surface 78 and an inner wall surface 80. The inner wall surfaces 80 are spaced apart and substantially parallel to provide guidance for the cable tie 56 to be received. The base surface 38*a* mates with the structural member 12 (seen in the view of FIG. 21). The saddle mount 16*d* includes a through bore 94 which provides a passageway through the saddle mount 16*d* for an attachment means, seen in phantom as a conventional nut 96*a* and bolt 96*b* combination in FIGS. 20*a* and 21. Hex shaped counter bore 94 further includes a constricted area of reduced diameter forming a through bore 98. The intersection of the through bore 98 and counter bore 94 provides a shoulder 99. The shoulder 99 serves as a support for the headed portion 96*c* of a bolt 96*b* or nut 96*a*. Though preferably countersunk as shown, it is within the providence of the present invention for the shoulder portion 99 to be defined at the top of intermediate area 100. A portion of through bore 94 may further include a hexagonal profile, as seen in FIG. 20*c*, to accommodate the hex head bolt 96*b* or nut 96*a*, or may have any other profile appropriate to securely hold an alternate attachment means. Alternatively, and by way of example only, through bore 94 could be a clearance hole to allow a fastener to spin for turning and tightening from the top side. It is to be understood that, as in previous embodiments, while a nut and bolt combination 96 is the preferred attachment means, other attachment means known to one skilled in the art may be used. A threaded nut 96*a* (not shown) could also be insert molded in hexagonal profile to reduce assembly time.

A further embodiment of the saddle mount, indicated by the reference numeral 16*e*, is seen in FIGS. 22*a*–22*f* inclusive. As in the previous embodiments, the saddle mount 16*e* is provided with a pair of side support or arched surfaces 62, for mounting of bundles 8 (not seen in these views), however the surfaces 62 are truncated to allow bundles 8 of varying sizes, especially smaller bundles, to be accommodated. Further, surface 62 is widened to maximize surface contact that reduces pinching and constricting of the bundles 8. The center support or arched surface 36*a*, seen in the previous embodiments is replaced in this embodiment by an intermediate area 100'. As seen particularly in FIGS. 22*a*–22*c*, the intermediate area 100' includes a recessed portion 106 which is adapted to receive the head 96*c* of a bolt 96*b* or nut 96*a* and the socket 70 of a socket wrench (seen in phantom). This feature allows the socket 70 to gain secure contact with the head 96*c* of a hex bolt 96*b* and thereby facilitate proper tightening of the bolt 96*b*. The intersection between the through bore 94 and intermediate area 100' provides a shoulder 99. The shoulder 99 serves as a support for the headed portion 96*c* of bolt 96*b*. Seen particularly in FIG. 22*b*, the saddle mount 16*e* is provided with at pair of side passages 68 for receiving and guiding a respective cable tie 56 (not seen in these views). Each side passageway 68 is provided with a distended end 72 and a constricted end 74. Each distended end 72 opens toward the base surface 38a, while each constricted end 74 terminates at a respective top aperture 102. As further seen in FIG. 22b, each side passage 68 includes an inwardly tapered outer wall surface 78 and an inner wall surface 80. The inner wall surfaces 80 are spaced apart and substantially parallel to provide guidance for the cable tie 56 to be received. Similarly to the previous embodiments, the base surface 38a mates with a structural member 12 (not seen in these views). The saddle mount 16e includes a through bore 94 which provides a passageway though the saddle mount 16e for an attachment means, seen in phantom as a conventional nut and bolt combination 96 in FIG. 22a. It is to be understood that, as in previous embodiments, while a nut 96a and bolt 96b combination is the preferred attachment means, other attachment means known to one skilled in the art may be used.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A mounting assembly for securing an object to a support member, said support member including a first side and a second side and an aperture communicating with each; of said sides, said assembly comprising:

an elongated tie including a strap portion and a headed portion, said strap potion being arranged to be received by the aperture of said support member and further being arranged to circumscribe said object, and said headed portion being arranged to abut said first side of said support member; and a saddle mount including an aperture and being interposed between said object and said support member, said saddle mount having a first surface and a second surface, said first surface being arranged for supporting engagement with said object and said second surface being adapted for supporting engagement with said second side of said support member.

2. The assembly of claim 1 wherein the distal end of said strap portion of said elongated tie is arranged to extend through said saddle mount aperture and to surround said object and further to be arranged to reenter said saddle mount aperture; and said elongated tie further including means for retaining the reentered portion of said strap portion.

3. The assembly of claim 1 wherein oppositely disposed side surfaces of said saddle mount are each provided with laterally extending support ribs.

4. The apparatus of claim 1 wherein said headed portion of said elongate tie includes an opening there through, the opening being smooth-walled and substantially wedge-shaped in cross-section; and said strap extending through said opening and having a wedge-shaped head at one end conforming generally to the shape of said opening and further having a plurality of teeth on the wedge-shaped head and teeth on each side of said strap.

5. The apparatus of claim 4 wherein said teeth extend substantially transversely across the strap.

6. The apparatus of claim 5 wherein said teeth extend substantially transversely across the wedge-shaped head.

7. The apparatus of claim 1 wherein said elongated tie and said saddle mount are each formed of injection molded plastic material.

8. A saddle mount device for securing at least one bundled article including a tie strap to a support member, said device arranged to be secured to said support member, said device arranged to be located between said support member and said bundled article, and wherein said device includes a bottom surface and oppositely disposed sidewalls, each sidewall being disposed angularly relative to said bottom surface, and each sidewall being arranged to support a respective one of a pair of said bundled articles, and each of said sidewalls including an inner wall surface defining a through passage for receiving a portion of the tie strap of said respective one of said pair or bundled articles and wherein said device includes a top wall having a top outer arched surface, said top outer surface arranged to support a third bundled article and a transverse passageway arranged to receive a portion of the tie strap of said third bundled article.

9. A saddle mount device for securing at least one bundled article including a tie strap to a support member, said device arranged to be secured to said support member, said device arranged to be located between said support member and said bundled article, and wherein said support member includes an opening therein and wherein said saddle mount device includes a bottom surface and an integrally formed supporting stud extending from said bottom surface and having series of longitudinally spaced barbs arranged to permit entrance of said stud into said opening of said support member, said barbs being arranged to engage the surface of said opening to resist withdrawal of said stud from said opening and said saddle mount device further including a primary reentrant bore.

10. The saddle mount device of claim 9 wherein said reentrant bore includes an upstanding tension tab.

* * * * *

UNITED STATES PATENT AND TRADEMARK OFFICE
CERTIFICATE OF CORRECTION

PATENT NO. : 6,533,226 B2
DATED : March 18, 2003
INVENTOR(S) : Gerard G. Geiger

It is certified that error appears in the above-identified patent and that said Letters Patent is hereby corrected as shown below:

Column 11,
Line 33, after "strap" delete "potion" and substitute -- portion --.

Signed and Sealed this

Twenty-third Day of November, 2004

JON W. DUDAS
*Director of the United States Patent and Trademark Office*